United States Patent
Boehringen et al.

(10) Patent No.: US 6,173,221 B1
(45) Date of Patent: *Jan. 9, 2001

(54) DEVICE FOR CONTROLLING THE STEERING ANGLE OF A VEHICLE

(75) Inventors: Michael Boehringen, Waiblingen; Lutz Eckstein, Stuttgart; Werner Reichelt, Esslingen, all of (DE)

(73) Assignee: DaimlerChrysler AG, Stuttgart (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/965,447

(22) Filed: Nov. 6, 1997

(30) Foreign Application Priority Data

Nov. 6, 1996 (DE) .............................. 196 45 646

(51) Int. Cl.[7] ...................................... B62D 6/02
(52) U.S. Cl. ............................ 701/41; 180/443
(58) Field of Search .............................. 701/41; 180/443, 180/402

(56) References Cited

U.S. PATENT DOCUMENTS

| | | | |
|---|---|---|---|
| 4,658,927 | * | 4/1987 | Kanazawa ............................ 180/422 |
| 4,739,855 | * | 4/1988 | Miyoshi et al. ...................... 180/422 |
| 5,097,917 | * | 3/1992 | Serizawa et al. .................... 180/402 |
| 5,181,173 | * | 1/1993 | Avitan ................................. 701/42 |
| 5,251,135 | * | 10/1993 | Serizawa et al. .................... 701/42 |
| 5,873,430 | * | 2/1999 | Mueller et al. ..................... 180/402 |
| 5,884,724 | * | 3/1999 | Bohner et al. ...................... 180/402 |

FOREIGN PATENT DOCUMENTS

| | | |
|---|---|---|
| 44 03 379 A1 | 8/1994 | (DE) . |
| 195 48 713 C1 | 5/1997 | (DE) . |
| 2 188 296 | 9/1987 | (GB) . |
| 62-18366 | 1/1987 | (JP) . |
| 4-283168 | 10/1992 | (JP) . |
| 124533 | 5/1993 | (JP) . |
| 139332 | 6/1993 | (JP) . |
| 6-144270 | 5/1994 | (JP) . |
| 58507 | 3/1997 | (JP) . |

OTHER PUBLICATIONS

P. Braenneby et al, "Improved Active and Passive Safety by Using Active Lateral Dynamic Control and an Unconventional Steering Unit", 13th Int'l Technical Conference on Experimental Safety Vehicles, Proceedings vol. 1, Nov. 4–7, 1991, p. 224.

* cited by examiner

Primary Examiner—Michael J. Zanelli
(74) Attorney, Agent, or Firm—Evenson, McKeown, Edwards & Lenahan, P.L.L.C.

(57) ABSTRACT

The invention provides a device for controlling the steering angle of a motor vehicle having an operating element such as a steering wheel. According to the invention the steering angle adjustment takes place as a function of an actuating parameter of the operating element, with a steering ratio that depends on the vehicle speed. The ratio is constant in the lower speed range, increases at least linearly in a medium speed range, and increases at most linearly in an upper speed range.

5 Claims, 2 Drawing Sheets

DEVICE FOR CONTROLLING THE STEERING ANGLE OF A VEHICLE

BACKGROUND AND SUMMARY OF THE INVENTION

This application claims the priority of German patent document 196 45 646.0, the disclosure of which is expressly incorporated by reference herein.

The invention relates to a device for controlling the steering angle of a vehicle that has an operating element for adjusting steering angle as a function of a parameter, such as the deflection of the operating element or the force exerted on the operating element.

Conventional devices of this type use a steering wheel as the operating element. The steering angle is adjusted by direct mechanical transmission of the steering wheel rotary movement to the vehicle wheels. It is also known to provide a steering wheel (or another user-operable operating element) that is mechanically decoupled from the steering movement of the wheels; by actuation of such a steering wheel, a steering angle adjusting unit can be controlled which in turn performs the corresponding steering angle adjustment of the wheels. Such arrangements with manually operable operating elements are described in the article by H. Bubb, "Arbeitsplatz Fahrer—Eine ergonomische Studie" [The Driver Workstation: An Ergonomic Study] Automobil-Industrie 3/85, page 265, and in U.S. Pat. No. 3,022,850. In the latter patent in particular, it is proposed to amplify the deflection signal of a control lever used for adjusting the steering as a function of the vehicle speed, preferably inversely proportionally to the square of the lengthwise velocity. Thus, a given control lever deflection results in essentially constant transverse acceleration, independent of the lengthwise speed of the vehicle.

In the article by P. Bränneby et al., "Improved Active and Passive Safety by Using Active Lateral Dynamic Control and an Unconventional Steering Unit," 13th International Technical Conference on Experimental Safety Vehicles, Proceedings Vol. 1, Nov. 4–7, 1991, page 224, a steering angle adjusting device is described in which a nonlinear steering angle characteristic is provided as a function of the deflection of the operating element, so that the setting of larger steering angle changes takes place with greater sensitivity than the setting of smaller steering angle changes. In other words, a given change in deflection of the operating element produces a smaller change in steering angle in the range of small steering angles than in the range of large steering angles. At the same time, the sensitivity of the steering angle adjustment is selected variably as a function of the vehicle speed. That is, it increases with vehicle lengthwise speed.

German patent document DE 44 03 379 A1 describes a steering system in which adjustment of the steering angle takes place with progressively increasing dependence on the steering wheel angle by actuating a conventional steering wheel. With increasing vehicle speed, a characteristic curve of the steering angle of the vehicle wheels that becomes flatter is chosen as a function of the steering wheel angle, so that the sensitivity of the steering decreases.

Unpublished German patent document DE 195 48 713 C1 describes a steering angle control device of the type mentioned above in which steering angle adjustment is performed as a function of the degree of actuation of the corresponding operating element, with a sensitivity that decreases with decreasing coefficient of friction and/or higher vehicle longitudinal speed.

One object of the present invention is to provide a steering angle control device of the type referred to previously, which permits steering of the vehicle that is safer from the driving dynamic standpoint and is ergonomically advantageous, especially with an operating element in the form of a control stick instead of a conventional steering wheel.

This and other objects and advantages are achieved according to the invention by performing the steering angle adjustment as a function of the degree of actuation of the operating element, with a steering ratio that depends upon the vehicle speed. The ratio is constant in a lower speed range while in a middle speed range it increases at least linearly, and in an upper speed range it increases at most linearly. The term "steering ratio" is the ratio of the rate of change of the actuating value to the rate of change of the steering angle (corresponding to the inverse of the sensitivity of the steering angle adjustment). Preferably the steering ratio in the medium speed range increases progressively more than linearly and in the upper speed range is decreasingly less than linearly increasing.

The constant steering angle ratio in the lower speed range means that at these low vehicle speeds the full steering angle of the vehicle wheels is available, for example for parking and maneuvering, as well as for utilizing the maximum physically possible transverse acceleration at the corresponding vehicle speed. The linear or more progressive pattern of the steering ratio in the medium speed range means that the maximum possible steering angle of the wheels, corresponding to the maximum value of the actuating parameter, decreases successively with increasing vehicle speed. In this manner, it is assured that the vehicle does not react too abruptly to a given actuation of the operating element, and as a result remains controllable in terms of driving dynamics. In the high speed range, the percentage of the slip angle at the steering angle increases continuously because of the increasing minimal curve radius that can be traveled. As a result, the steering angle that is required in the current situation for rounding a curve at the maximum transverse acceleration for an understeering vehicle with increasing longitudinal velocity approximately tends toward the value of the slip angle that permits development of a maximum lateral force on the wheels. It develops that with this behavior the steering ratio pattern, which according to the invention increases linearly or less degressively shows good correlation with higher vehicle speed.

In one embodiment of the invention, the steering ratio converges with increasing vehicle speed toward a maximum value whose corresponding maximum steering angle value corresponds to the slip angle value that permits maximum lateral force development. With these measures, the device is very well suited for the property mentioned above, namely that the steering angle for an understeering vehicle, with increasing speed, is intended to approach approximately the slip angle value that permits maximum lateral force, in order to make it possible to round a curve with maximum transverse acceleration.

In an other embodiment, steering angle adjustment takes place with a dependence on the operating element actuating value that is less than quadratic, and at least linearly increasing. This path of the curve of the steering angle to be adjusted as a function of the operating element actuating parameter is favorably adapted to intuitive driver behavior that conforms to control engineering.

Other objects, advantages and novel features of the present invention will become apparent from the following detailed description of the invention when considered in conjunction with the accompanying drawings.

DETAILED DESCRIPTION OF THE DRAWINGS

Figure 1:
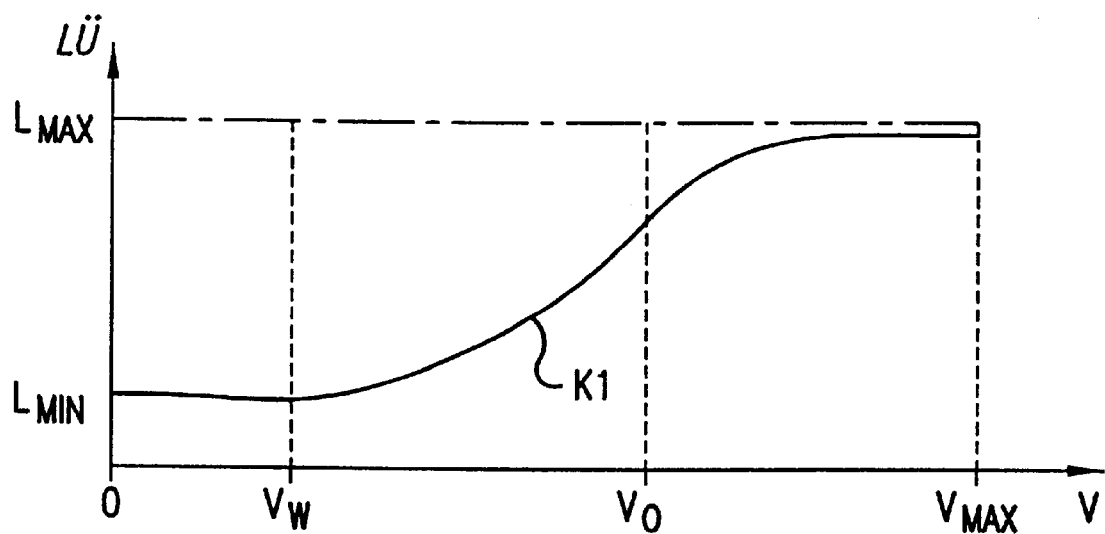
FIG. 1 is a graph showing the steering ratio as a function of the lengthwise speed of the vehicle for a device for controlling the steering angle with a corresponding operating element for an automobile.
Figure 2:
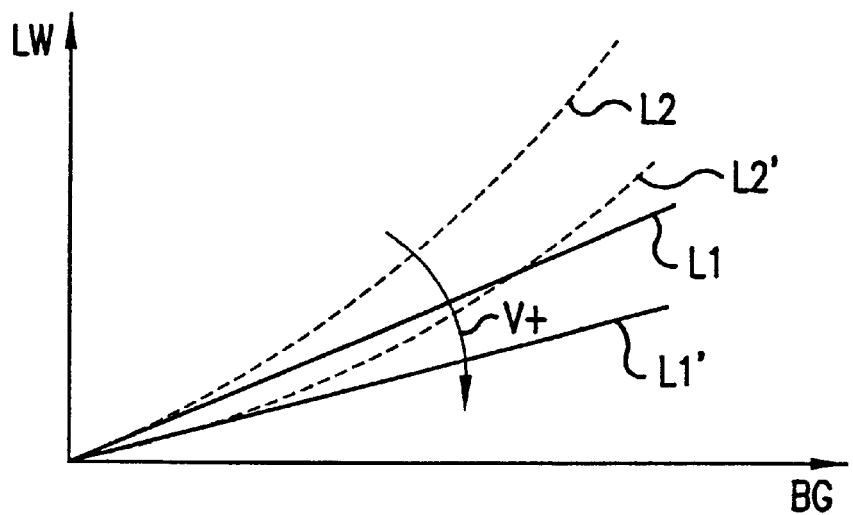
FIG. 2 shows various possible curves of the steering angle to be adjusted as a function of the operating element actuating parameter for the device according to FIG. 1.

FIGS. 1 and 2 present various curves to show the function of a correspondingly designed device for controlling the steering angle of an automobile. This steering function may be implemented, for example, using one of the devices known from the publications referred to at the outset, with only the steering unit being so designed or modified that it delivers to the respective steering angle adjusting unit adjusting commands corresponding to the curves shown. The device can incorporate as the operating element a steering wheel or a steering lever that is preferably mechanically decoupled from the steering movement of the wheels. Deflection of the wheel or lever or the actuating force exerted thereon serves as the operating element actuating parameter whose value determines the steering angle to be set according to the functional relationship embodied in the curves shown.

The steering angle control device is designed so that its steering ratio Lü depends on the longitudinal speed v of the vehicle according to a special curve K1 shown (qualitatively) in FIG. 1. The steering ratio Lü is defined as the ratio of the rate of change of the operating element actuating parameter to that of the corresponding steering angle value; in other words, the inverse of the sensitivity of the steering angle adjustment. Of course the steering ratio Lü itself can vary as a function of the operating element actuating parameter.

As can be seen from FIG. 1, the steering ratio Lü, depending on the speed v of the vehicle, remains constantly at a predetermined minimum value $L_{min}$ in a lower speed range between the speed value of zero and a presettable lower speed threshold value vu. This minimum steering ratio $L_{min}$ is chosen so that the full steering angle of the vehicle wheels is set when the operating element is actuated with a maximum value of the operating element actuating parameter. In this manner, it is assured that for the lower speed range [0, vu] the full steering angle of the wheels will be available, so as to utilize the maximum physically possible transverse acceleration.

In an adjacent medium speed range between the lower speed threshold value vu and a specified upper speed threshold value vo, the steering ratio Lü of the steering control device increases progressively with increasing vehicle lengthwise velocity v, according to curve K1, at least linearly and preferably to a degree that is greater than linear. Thus, in this medium speed range (vu, vo), with maximum operating element actuation, only a portion of the maximum physically possible steering angle of the wheels, that decreases with increasing speed, is set as the maximum achievable steering angle value. This avoids the vehicle's reacting unintentionally vigorously to an operating element actuation of a certain magnitude with increasing vehicle speed. The vehicle therefore remains safely steerable in terms of driving dynamics, and can be controlled adequately in terms of its transverse dynamics by the driver, even in this speed range.

In the upper speed range, above the upper speed threshold value vo, and up to the maximum vehicle speed vmax, the steering ratio Lü according to curve K1 has a degressively increasing pattern. That is, the steering ratio Lü increases less than linearly with increasing vehicle speed v. Therefore, upon reaching the maximum vehicle speed vmax, it converges toward a maximum steering ratio value Lmax that can be determined by the following consideration. In this high speed range (vo, $v_{max}$) the curve radius that can still be traversed increases with increasing vehicle speed v so that the percentage of the slip angle at the steering angle continues to increase. This means that the steering angle required to round the curve with maximum transverse acceleration for an understeering vehicle with increasing speed tends approximately toward the value of the slip angle, thereby permitting development of a maximum lateral force at the wheels. This fact supports the steering ratio curve K1 in the high speed range ($v_o$, $v_{max}$) through its degressive curve, and thus takes into account the fact that the maximum steering angle associated with the maximum steering ratio value $L_{max}$ with maximum operating element actuation accommodates approximately this value of the slip angle that permits the maximum lateral force at the wheels.

Another embodiment of the invention takes intuitive driver steering behavior into account in that the steering angle LW to be set increases linearly or slightly progressively (with a progression exponent smaller than 2, or in other words, less than quadratically) with increasing value of the operating element actuating parameter BG. Curves that can be used are shown qualitatively in FIG. 2 for example.

A first solid curve L1 provides a linear dependence of the steering angle value LW on the value of operating element actuating parameter BG. This curve L1, on the basis of the speed-dependent steering ratio Lü explained above is only valid for a certain speed value. A speed arrow v' shown in FIG. 2 indicates how the steering angle curve valid for a certain speed value changes with the speed v of the vehicle. As can be seen, the respective steering angle curve becomes flatter with increasing vehicle speed, corresponding to an increasing steering ratio. For example FIG. 2 shows a linear curve L1' that follows from the above-mentioned linear curve L1 and belongs to a higher speed value than the latter. Similarly, as a further possible example, a steering angle curve L2 that increases slightly progressively with an exponent greater than 1 and less than 2 is shown as a dashed line in FIG. 2 and corresponds to the same speed value as the alternative linear characteristic L1. The curve L2' that belongs to this slightly progressively rising curve L2 at the higher speed value of linear curve L1' and also rises weakly is likewise shown dashed in FIG. 2.

The linear (or only slightly greater than linear) dependence of steering angle LW on operating element actuating parameter BG favorably corresponds to the linear models with which operators of control and regulating devices predominantly operate when performing control and regulation tasks, and are therefore well adapted to intuitive driver expectation.

Figure 3:
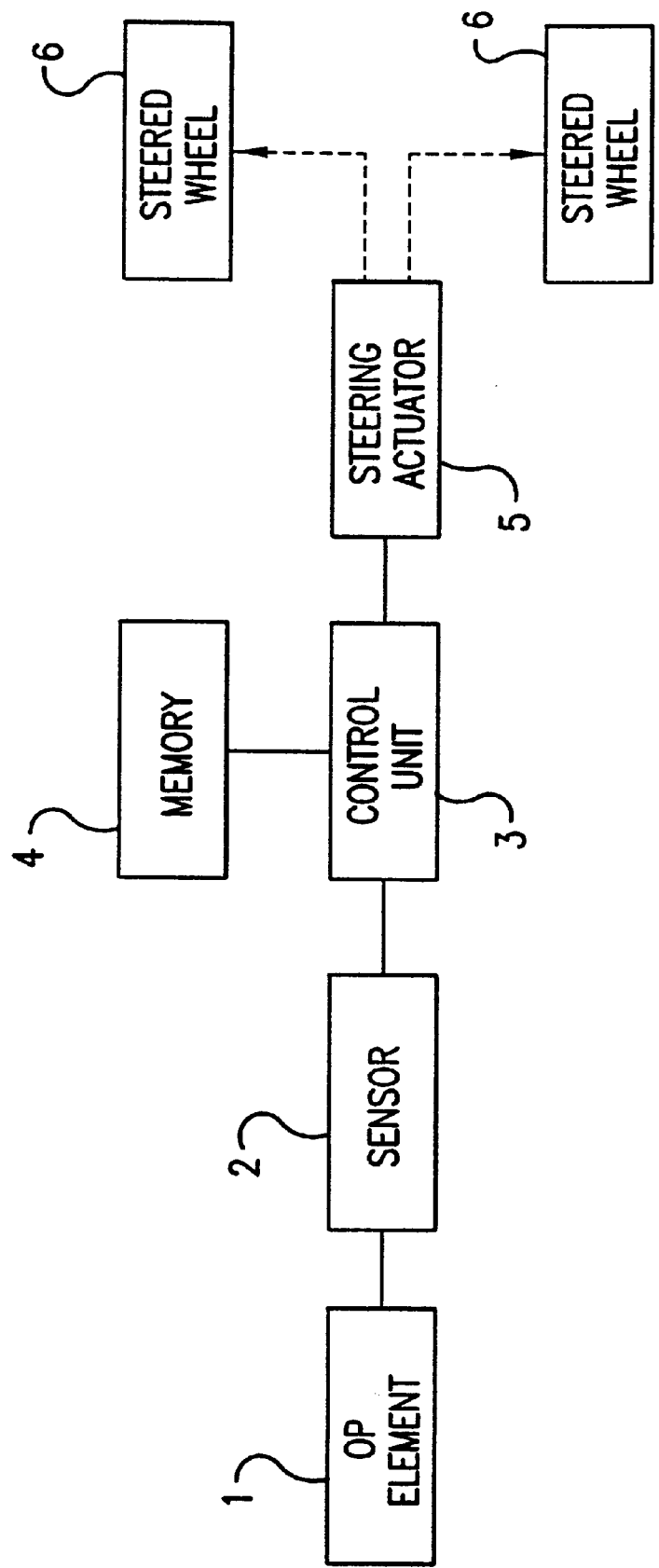
FIG. 3 is a block diagram of a device for performing steering control according to the invention.

FIG. 3 is a schematic block diagram which shows an example of a steering arrangement for implementing the nonlinear steering control according to the invention. As noted previously an operating element 1 such as a steering wheel may be mechanically decoupled from the wheels. Instead, the actuation of the operating element 1 is detected by a sensor 2, which provides a signal indicative thereof to a control unit 3, which may be a computer which is otherwise already present in the vehicle. Curves representative of the functional relationship such as illustrated in FIGS. 1 and 2 are stored in a memory 4, and this information is used to generate a command signal which causes the steering actuator 5 to adjust the steering angle of the wheels 6 accordingly.

Preferably the steering control device also incorporates a conventional stabilization system (not shown) that generates stabilizing vehicle moments in the driving dynamics boundary area. This takes into account the fact that the above-mentioned speed-dependent variable steering ratio in the driving dynamics boundary area in the set value setting by distance can create a situation in which because of the limited steering angle of the wheels the currently maximum adjustable steering angle is not sufficient in every case to stabilize the vehicle by itself. For example, with the stabilization system, when the rear of the vehicle threatens to break loose, a compensating stabilizing moment is developed around the vertical axis of the vehicle in order to account for the fact that, in contrast to conventional steering control devices with a fixed steering ratio, in the device according to the invention, the maximum steering angle that can be set continues to decrease as the speed increases. One possible stabilization system that can be used for example, which builds up stabilizing moments with brake applications at individual wheels, is the system known by the abbreviation of ESP (electronic stability control).

Alternatively or in addition to such a stabilizing system, provision can be made to increase the value range for the operating element actuating parameter with increasing vehicle speed so that regardless of the lengthwise speed of the vehicle, the maximum physically possible steering angle can always be set approximately.

This can be accomplished for example in the case of an isometric operating element in which the force exerted on the operating element serves as the actuating parameter that determines the steering angle to be set, in such fashion that higher speed-dependent maximum actuating forces are permitted.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Device for controlling steering of a vehicle having an operating element for adjusting a vehicle steering angle, comprising:

a unit which controls the steering angle adjustment as a function of an actuating parameter of the operating element; wherein the steering angle adjustment is performed according to at least one steering ratio characteristic curve that depends on vehicle longitudinal speed;

throughout a lower speed range, said at least one steering ratio characteristic curve is constant;

in a medium speed range, said at least one steering ratio characteristic curve increases at least linearly with increasing vehicle longitudinal speed;

in an upper speed range, said at least one steering ratio characteristic curve at most increases linearly with increasing vehicle longitudinal speed; and the steering angle adjustment increases with less than quadratic dependence and at least linear dependence on the operating element actuating parameter.

2. Device according to claim 1, wherein the steering ratio converges with increasing vehicle longitudinal speed toward a maximum value associated with a maximum steering angle value which corresponds to a slip angle value that permits maximum lateral force development at the vehicle wheels.

3. Device for controlling steering of a vehicle having an operating element for adjusting a vehicle steering angle according to claim 1, wherein said steering ratio increases substantially in accordance with a characteristic curve wich is defined by a power series expansion having a maximum exponent greater than 1.0 in said medium speed range, and less than 1.0 in said upper speed range.

4. Device for controlling steering of a vehicle having an operating element for adjusting a vehicle steering angle according to claim 1, wherein said lower speed range comprises vehicle speeds which are less than a first preset value, said medium speed range comprises vehicle speeds which are greater than said first preset value and less than a second preset value, and said upper speed range comprises vehicle speeds which are greater than said second preset value.

5. Apparatus for controlling the steering angle of a vehicle having a steering angle actuating element, comprising:

a sensor for detecting an operating parameter of said actuating element and for generating an output signal indicative thereof;

a control unit coupled to receive said output signal, which control unit generates a command signal for adjustment of the steering angle of the vehicle as a function of said output signal, based on characteristics stored in a memory therein; and a steering angle actuator for adjusting the steering of the vehicle in response to said command signal;

wherein said characteristics provide a steering ratio that depends on vehicle speed, said steering ratio being constant in a lower speed range, increasing at least linearly with increasing vehicle longitudinal speed in a medium speed range, and at most increasing linearly with increasing vehicle longitudinal speed in an upper speed range; and wherein the steering angle adjustment increases with less than quadratic dependence and at least linear dependence on the operating element actuating parameter.

* * * * *